(12) United States Patent
Nowak

(10) Patent No.: US 11,548,090 B2
(45) Date of Patent: *Jan. 10, 2023

(54) WELDING APPARATUS AND TECHNIQUES FOR ELEVATED PIERCE CURRENT

(71) Applicant: The ESAB Group Inc., Florence, SC (US)

(72) Inventor: Joshua Nowak, Hanover, NH (US)

(73) Assignee: THE ESAB GROUP INC., Florence, SC (US)

( * ) Notice: Subject to any disclaimer, the term of this patent is extended or adjusted under 35 U.S.C. 154(b) by 375 days.

This patent is subject to a terminal disclaimer.

(21) Appl. No.: 16/574,438

(22) Filed: Sep. 18, 2019

(65) Prior Publication Data

US 2020/0009678 A1    Jan. 9, 2020

Related U.S. Application Data

(63) Continuation of application No. 15/626,593, filed on Jun. 19, 2017.

(51) Int. Cl.
*B23K 10/00* (2006.01)
*H05H 1/36* (2006.01)

(52) U.S. Cl.
CPC .......... *B23K 10/006* (2013.01); *H05H 1/36* (2013.01)

(58) Field of Classification Search
CPC ....... B23K 10/00; B23K 10/006; B23K 10/02
USPC ............ 219/137 R, 137 PS, 121.54, 121.57, 219/121.55, 121.39, 121.45, 121.44
See application file for complete search history.

(56) References Cited

U.S. PATENT DOCUMENTS

| | | | |
|---|---|---|---|
| 4,418,266 A * | 11/1983 | Rosenbeck | B23K 9/032 219/124.34 |
| 5,296,665 A | 3/1994 | Peterson | |
| 5,424,507 A * | 6/1995 | Yamaguchi | B23K 10/006 219/121.39 |
| 5,506,384 A * | 4/1996 | Yamaguchi | B23K 10/006 219/121.54 |
| 5,548,097 A | 8/1996 | Couch, Jr. | |
| 5,614,110 A | 3/1997 | Shintani | |

(Continued)

FOREIGN PATENT DOCUMENTS

| | | |
|---|---|---|
| CA | 2266273 A1 | 10/1999 |
| CN | 108465923 A | 8/2018 |
| EP | 3367762 A1 | 8/2018 |

OTHER PUBLICATIONS

Notification of Transmittal of International Search Report and Written Opinion including International Search Report and Written Opinion for International Application No. PCT/US2018/037468 dated Sep. 28, 2018, 12 pages.

(Continued)

*Primary Examiner* — Jimmy Chou
(74) *Attorney, Agent, or Firm* — Edell, Shapiro & Finnan, LLC

(57) ABSTRACT

An apparatus may include a power supply to generate an output current. The apparatus may further include a plasma torch to apply the output current across a gap and a user interface to receive a selection for enabling a pierce current mode. The apparatus may further include a controller to temporarily increase an output current setting at the plasma torch from a first level to a second level, responsive to the selection of pierce current mode.

10 Claims, 3 Drawing Sheets

(56) References Cited

U.S. PATENT DOCUMENTS

| | | | | |
|---|---|---|---|---|
| 5,620,617 | A * | 4/1997 | Borowy | B23K 10/00 |
| | | | | 219/121.39 |
| 5,653,895 | A | 8/1997 | Shintani | |
| 5,990,443 | A * | 11/1999 | Tatham | H05H 1/36 |
| | | | | 219/121.57 |
| 6,133,543 | A * | 10/2000 | Borowy | H05H 1/36 |
| | | | | 219/121.57 |
| 6,359,251 | B1 | 3/2002 | Picard et al. | |
| 6,369,350 | B1 * | 4/2002 | Norris | H05H 1/36 |
| | | | | 219/121.57 |
| 6,947,802 | B2 * | 9/2005 | Picard | B23K 26/14 |
| | | | | 700/117 |
| 7,034,245 | B2 * | 4/2006 | Eldridge | B23K 10/006 |
| | | | | 219/121.54 |
| 8,049,140 | B2 * | 11/2011 | Kawamoto | B23K 9/092 |
| | | | | 219/137 PS |
| 8,168,916 | B2 | 5/2012 | Hussary et al. | |
| 9,833,860 | B1 * | 12/2017 | Peters | B23K 9/0671 |
| 10,464,159 | B2 * | 11/2019 | Nowak | B23K 10/006 |
| 11,040,412 | B2 * | 6/2021 | Jogdand | H05H 1/3405 |
| 2005/0051524 | A1 * | 3/2005 | Blankenship | B23K 9/1062 |
| | | | | 219/130.51 |
| 2006/0163216 | A1 * | 7/2006 | Brandt | H05H 1/36 |
| | | | | 219/121.39 |
| 2008/0237201 | A1 | 10/2008 | Shipulski | |
| 2010/0018954 | A1 * | 1/2010 | Hussary | H05H 1/36 |
| | | | | 219/121.36 |
| 2010/0084381 | A1 * | 4/2010 | Indraczek | B23K 10/022 |
| | | | | 219/121.39 |
| 2010/0155377 | A1 | 6/2010 | Lindsay | |
| 2017/0095879 | A1 * | 4/2017 | Mitra | H05H 1/36 |
| 2018/0361497 | A1 * | 12/2018 | Nowak | B23K 10/006 |

OTHER PUBLICATIONS

Office Action for Canadian Patent Application No. 3,066,376 dated Jan. 28, 2020, 5 pages.
Communication Pursuant to Article 94(3) EPC for European Patent Application No. 18738078.7 dated Jan. 19, 2021, 5 pages.
First Office Action for Chines Patent Application No. 201880040820.X with English translation, dated Jan. 26, 2021, 21 pages.
Examination Report No. 1 for Australian Patent Application No. 2018288646 dated Nov. 9, 2020, 4 pages.

* cited by examiner

WELDING APPARATUS AND TECHNIQUES FOR ELEVATED PIERCE CURRENT

This application is a continuation of U.S. application Ser. No. 15/626,593, filed Jun. 19, 2017, the contents of which is incorporated herein by reference in its entirety.

TECHNICAL FIELD

The present embodiments are related to power supplies for welding type power, that is, power generally used for cutting, welding or heating.

BACKGROUND

Plasma arc cutting is a known technique for cutting metallic materials, such as steels, aluminum, and the like. A plasma arc apparatus may include a plasma arc torch used to generate an arc of sufficient power to cut a material having a given thickness. In known plasma torch operations, a cut may be performed by initiating a cut along an edge of a workpiece. Such cuts may be appropriate for separating one section of a metal plate from an adjacent section. Alternatively, a plasma torch operation may be initiated by piercing through a metal plate to establish an isolated hole. From this point, a cutting operation may remove a section, such as a circular section from within a larger plate.

At a given amperage applied to a workpiece, a plasma torch may be able to cut a thicker material of a given metal (from the side) than can be pierced in a hole. For cutting a metal at these thicknesses, the cut accordingly needs to begin at the edge of the material being cut. This factor limits the applications for a given power supply and precludes the possibility of cutting holes in the given material at that power.

With respect to these and other considerations, the present disclosure is provided.

BRIEF SUMMARY

In one embodiment, an apparatus may include a power supply to generate an output current. The apparatus may further include a plasma torch to apply the output current across a gap and a user interface to receive a selection for enabling a pierce current mode. The apparatus may further include a controller to temporarily increase an output current setting at the plasma torch from a first level to a second level, responsive to the selection of pierce current mode.

In another embodiment, a method of cutting a workpiece may include receiving a signal indicating a cut current setting corresponding to a value of output current at a first level for a plasma torch. The method may further include receiving an indication that a pierce current mode is enabled, and sending a first control signal to increase the value of output current for the plasma torch from the first level to a second level.

In a further embodiment, an apparatus to control a plasma cutting operation may include a power supply to generate an output current. The apparatus may further include a plasma torch to apply the output current across a gap. The apparatus may also include a controller arranged to: set the output current to a zeroth level for arc initiation; increase the output current to a temporary second level for a predetermined duration of five second or less; and subsequently decrease the output current to a steady state cutting current for a balance of the plasma cutting operation.

DESCRIPTION OF EMBODIMENTS

Various embodiments provide components and techniques for improved operation of a plasma cutting apparatus. In particular, the present embodiments take advantage of the fact that power supplies for operations such as plasma cutting may be limited by the thermal load/cycling on the components of the power supply. This consideration leads to a duty cycle rating, e.g. 100% at 40 Amperes (40 A), 80% at 60 A, 40% at 100 A. A given power supply may limit its output power according to the duty cycle, which duty cycle may be determined for operation over periods of time, such as several minutes. This limitation may unduly limit the current that is output by a plasma torch for cutting, since this may prevent operation at current levels needed to pierce a given material. Notably, in the present embodiments, the current output may be increased for a period of time during an initial operation that does not cause the components to exceed thermal load/cycling, allowing thicker materials to be cut in a piercing operation. If this "pierce current" is not too much in excess of the nominal cutting current, the consumable life will not be greatly adversely affected by such operation.

Figure 1:
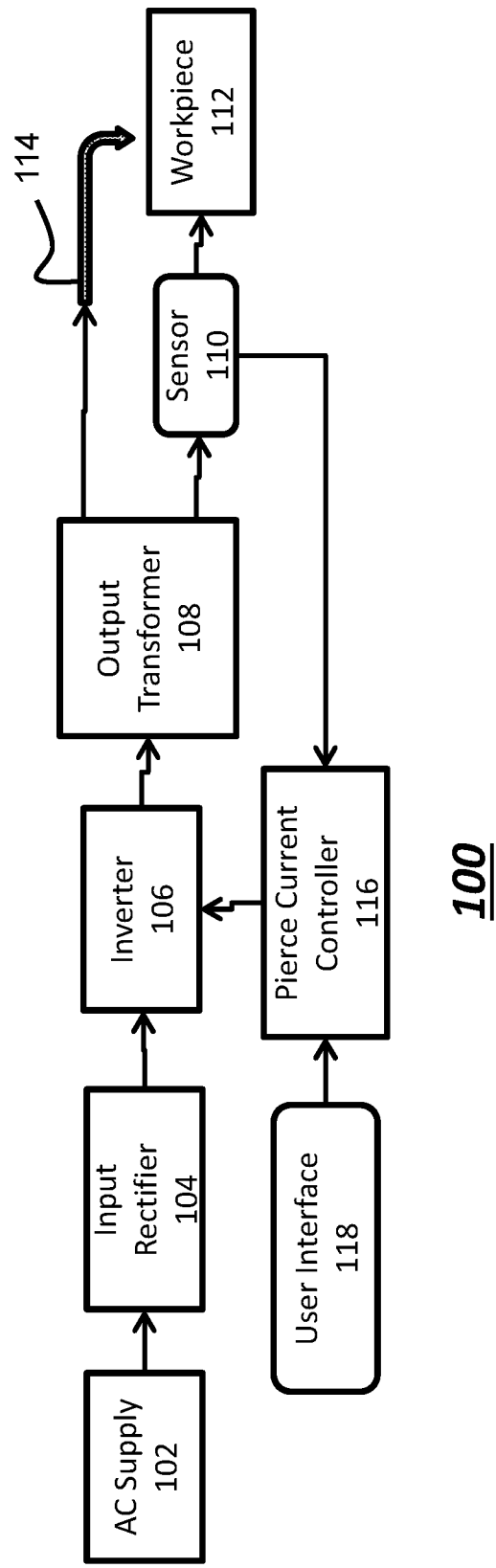
FIG. 1 presents an apparatus for plasma cutting, according to various embodiments of the disclosure.

FIG. 1 illustrates an apparatus 100, according to various embodiments of the disclosure.

The apparatus 100 may be configured to receive power, such as AC power from an AC supply 102, as shown. The AC supply 102 may provide, for example, 120 VAC power, or 208-230 VAC power. The embodiments are not limited in this context. The apparatus 100 may further include an input rectifier 104 as well as an inverter 106, to generate output current for cutting according to known principles. For example, an output of the inverter 106 may be provided to a workpiece 112 via an output transformer 108. The apparatus 100 may be rated to deliver a maximum output current via the plasma torch 114. The maximum output current may be set according to the duty cycle for operation of the apparatus 100. For example, at a 40% duty cycle the maximum output current may be 60 A, 80 A or other value. The embodiments are not limited in this context. As used herein, the term "duty cycle" may refer to the percentage time that the apparatus 100 is operated at high output current, such as 60 A, over a period of minutes. For example, a 40% duty cycle may correspond to operating the apparatus 100 at high output current for cutting for a period of 4 minutes, while not operating for six minutes. This operation at 40% duty cycle may be continued where cutting at 60 A output current takes place for 40% or less total time.

The apparatus 100 may further include a current sensor, shown as sensor 110, which may measure output current on the secondary side of the apparatus 100, as shown. The sensor 110 may provide real time measurement of output current, which measurement may be used to control operation of the apparatus 100. In operation, the apparatus 100 may be limited to a maximum output current, at least for long durations spanning times greater than several seconds. The maximum output current may determine the maximum thickness of a material for workpiece 112 that can successfully be cut by the plasma torch 114.

In various embodiments, the apparatus 100 may further include a pierce current controller 116, which component may be embodied in a combination of software and hardware according to embodiments of the instant disclosure. For cutting operations where a workpiece is a metal plate and where cutting of the workpiece proceeds from the edge of workpiece 112, the maximum thickness of workpiece 112 that can be cut may be greater than for cutting operations where the workpiece 112 is to be initially pierced in the middle of the workpiece 112. For example, 60 A current may be effective for cutting a ¾" metal plate from the edge, while 60 A may be able to pierce a hole through just ½" metal plate, and may be ineffective to pierce a hole through a ¾" metal plate.

In order to address the above issue, the pierce current controller 116 is provided with the capability to adjust the output current for operating apparatus 100, at least for a short duration, such as on the order of several seconds or less. In various embodiments, the pierce current controller 116 may control components of the apparatus 100, such as the inverter 106, to facilitate operation at a higher output current than the output current set for cutting operation of the apparatus 100. By allowing the operating at a higher output current for short periods of time, a "pierce current" may be delivered by the plasma torch 114 that exceeds a set output current, such as 60 A, at least for a duration sufficient to pierce a hole in the workpiece 112. As an example, a pierce current of 90 A may be enabled by the pierce current controller 116, so that up to 90 A may be delivered to the plasma torch 114 for a period of one second, facilitating the ability to pierce a hole in a ¾" metal plate, as represented by workpiece 112. Subsequently, the output current may be limited to 60 A, for example, for continued cutting of the workpiece 112, which cutting may proceed for a duration of minutes. In other words, once a hole is established in the workpiece 112, the cutting of workpiece 112 may proceed at a lower current level than needed to establish the hole. In this manner, a cut in workpiece 112 may be generated that is entirely formed while not cutting the workpiece 112 from the side, while not exceeding the rated output current for the apparatus 100. Because the duration of elevated pierce current is limited to less than several seconds, as an example, the total average current for a cutting operation lasting several minutes may be approximately the same as in the case where 60 A current is never exceeded.

As also shown in FIG. 1, the apparatus 100 may include a user interface 118, where the user interface 118 may include a screen, dial, or other device, providing a display, a selectable menu, or other known interface for a user to engage. One embodiment of a user interface 118 is discussed below with respect to FIG. 2. The user interface 118 may allow a user to select parameters for operation of the apparatus 100, including different modes of operation. As an example, the user interface 118 may provide for selection of whether to operate the apparatus 100 to allow for increased pierce current, where the output current may exceed the normal output current for a limited duration.

Figure 2:
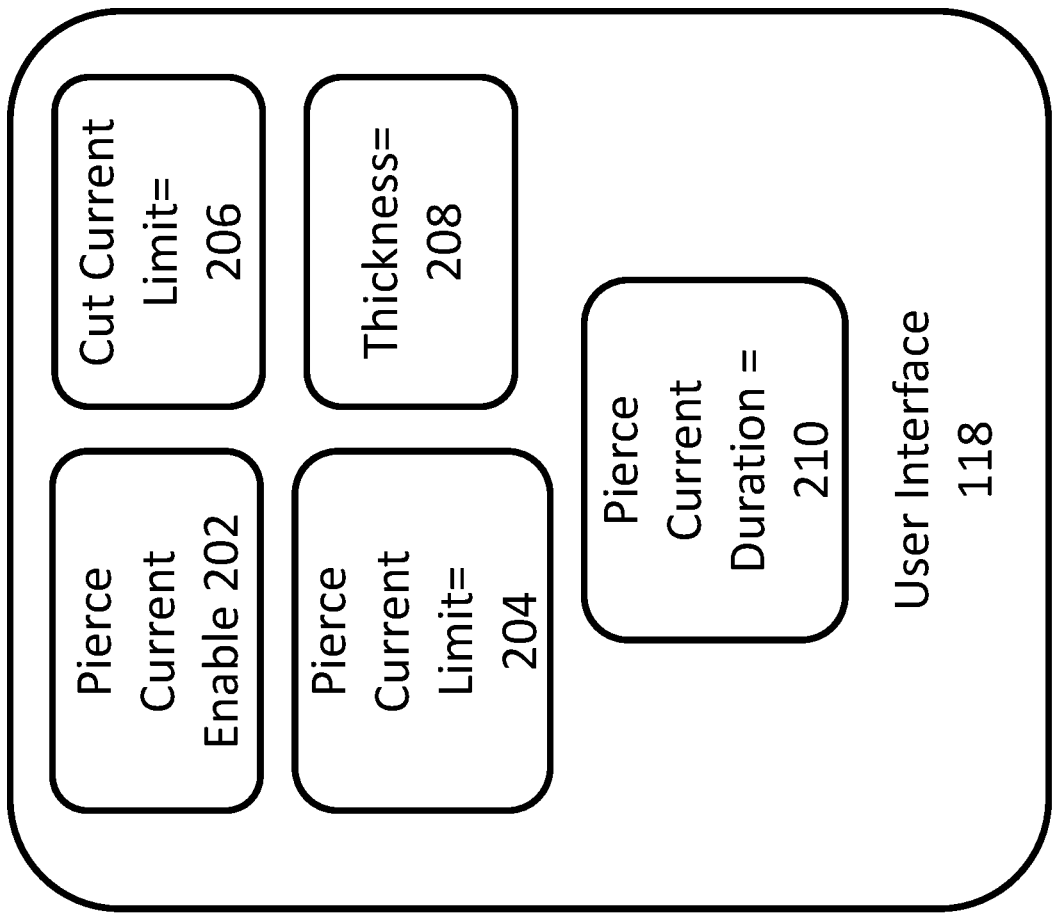
FIG. 2 presents a user interface according to embodiments of the disclosure.

Turning now to FIG. 2, an embodiment of the user interface 118 is shown, where the user interface 118 may be embodied as a menu, such as a menu on a display. A PIERCE CURRENT ENABLE component 202 is provided that allows a user to enable operation of the apparatus 100 in a pierce current mode, that is, in a mode providing for increased output current. When selected, the PIERCE CURRENT ENABLE component 202, in conjunction with the pierce current controller 116, may set the maximum output current that can be generated by the inverter 106 from a first level to second level. As an example, the first level of output power may correspond to 60 A for operating the plasma torch 114 to perform continuous cutting over a duration up to several minutes. A second level of maximum output power may correspond to 90 A, for operating the plasma torch 114 for a short duration, such as several seconds or less. In some examples the second level may be a predetermined level. This operation may be appropriate for generating a hole within the workpiece 112, for example, where 60 A current may be insufficient power for the plasma torch 114 to penetrate a hole through the workpiece 112.

As also shown in FIG. 2, the user interface 118 may include a PIERCE CURRENT LIMIT component 204, where a user may enter a value of maximum output current when pierce current is enabled. For example, if 60 A represents the normal output current, the PIERCE CURRENT LIMIT component 204 may permit a user to enter values of output current in excess of 60 A, up to a determined maximum or limit. Thus, a user may enter "70 A" or "80 A" as an example. Subsequently, the pierce current controller 116 may limit output current during a pierce current operation to the value of current selected by the user. In other embodiments, if pierce current operation is enabled, the pierce current controller 116 may automatically set an output current for operation in pierce current mode, such as 90 A, without additional input from a user.

In some embodiments, the user interface may also provide other components (i.e., configuration parameters), such as a CUT CURRENT LIMIT component 206, which component allows a user to manually select an output current for sustained cutting, such as 60 A. Once set, the inverter 106 may limit output current to 60 A for extended duration, such as over several minutes. In some embodiments, once the value of cut current is selected, a value of pierce current may be generated accordingly. Thus, if 60 A is set for cut current, a pierce current, that is, an output current for a short duration, may be set at 90 A automatically without user intervention.

As further shown in FIG. 2, the user interface 118 may include a THICKNESS SELECT component 208 component. When a user engages the THICKNESS SELECT component 208, the user may enter a thickness of the workpiece 112 to be cut. Based upon the thickness selected, the pierce current controller 116 may set a limit for output current for cutting for an extended duration, such as 60 A, while also setting the pierce current, such a 90 A, all without additional user input.

As additionally shown in FIG. 2, the user interface 118 may include a PIERCE CURRENT DURATION component 210, which allows the duration of operation at a higher output current to be manually selected. In some examples, a user may select different durations up to a maximum duration, such as ½ second, 1 second, 2 seconds, and so forth.

In operation, when pierce current mode is enabled the pierce current controller 116, in conjunction with the inverter 106, may limit output current at the plasma torch 114 as follows. When a plasma cutting operation is to be performed a plasma gas may be flowed to the apparatus 100, while a pilot current at relatively low value is established to generate a plasma arc. At a subsequent moment when the plasma torch 114 is applied to a workpiece 112, the output current may be increased to cut the workpiece, while the output current is limited by control of the inverter 106 to a pierce current value, such as 90 A. In other words, during a predetermined period, the inverter 106 may be controlled by pierce current controller 116 to limit output current at the plasma torch 114 to up to a value of 90 A. For example, the sensor 110 may provide real time output current information to the pierce current controller 116 to control operation of the inverter 106, so that output current does not exceed 90 A. Moreover, the duration where output current is limited to 90 A may be preset, so that once an initial period of operation of the plasma torch 114 has elapsed, the output current may be limited to a lower value. For example, after one second, the pierce current controller 116 may then control the inverter 106 to limit output current to a default output current, such as 60 A, for an extended duration, such as several minutes.

Thus, with pierce current mode enabled, a given cutting operation may involve two distinct intervals, where during an initial interval of several seconds or less, a relatively higher output current may be generated, while during a following interval of up to several minutes, a relatively lower output current may be generated. Because the apparatus, such as apparatus 100 may operate for short intervals at an increased current above a current level sustainable for long term cutting, the piercing of holes in otherwise uncuttable materials may be accomplished.

While in aforementioned embodiments, an apparatus may include an interface or other mechanism for enabling a pierce current mode, in additional embodiments a plasma cutting apparatus may be arranged to automatically provide a pierce current operation, while not requiring any particular mode to be enabled. For example, an apparatus may include a controller arranged to set the output current to a zeroth level for arc initiation and/or piloting, and to increase the output current to a temporary second level for a predetermined duration of five second or less, and to subsequently decrease the output current when the predetermined interval (duration) has elapsed to a steady state cutting current for a balance of the plasma cutting operation. All of these operations may be automatically initiated in sequence by the controller in the absence of selection of an operating mode.

Figure 3:
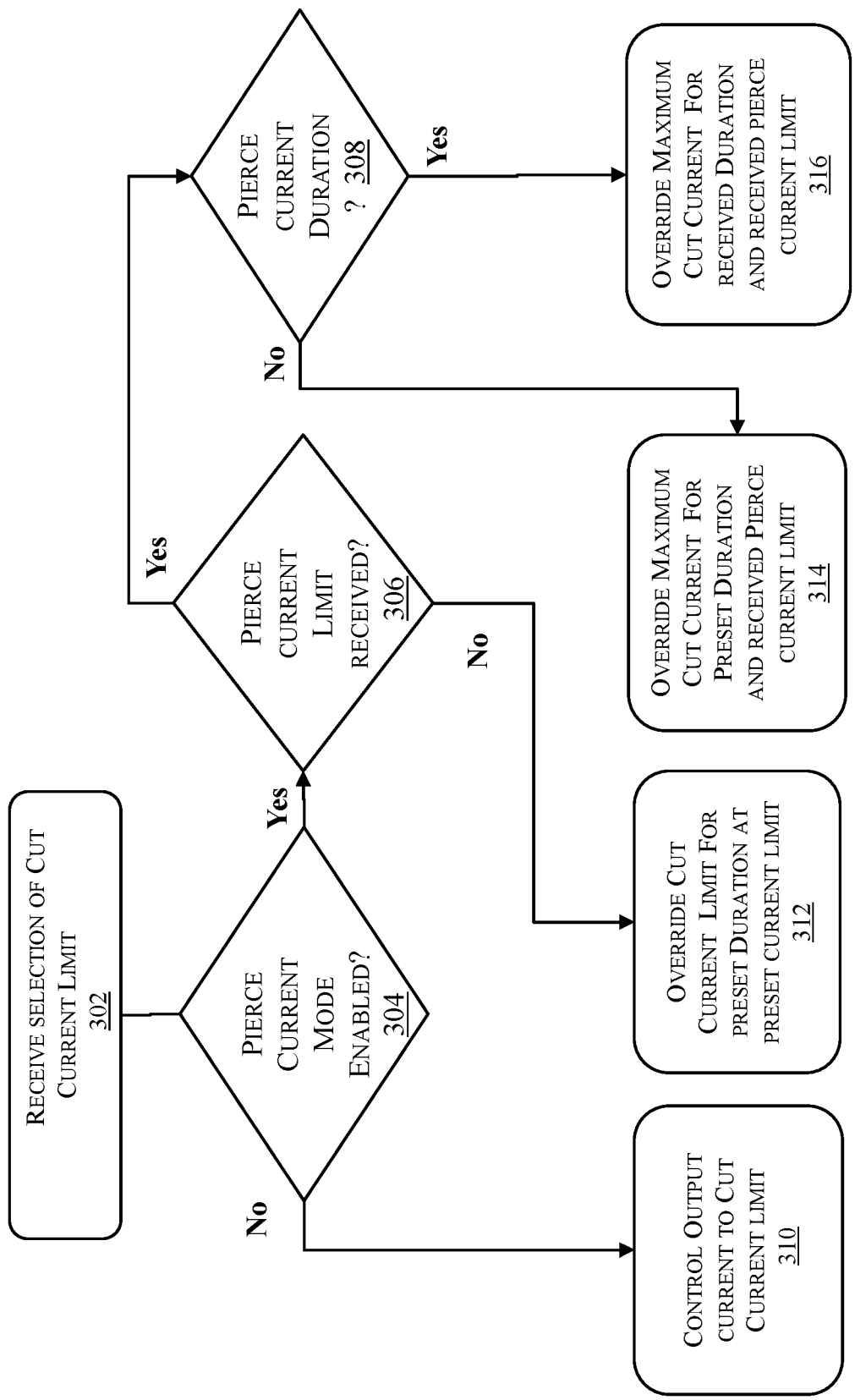
FIG. 3 presents a process flow according to embodiments of the disclosure.

FIG. 3 depicts an exemplary process flow 300, according to embodiments of the disclosure. At block 302, a selection of cut current is received. The cut current may correspond to the output current to be delivered to a plasma torch over an extended period of time, such as up to many minutes. The selection of cut current may be received through a user interface, such as a dial, a touch screen, a keypad, or other device. The flow then proceeds to block 304.

At block 304 a determination is made as to whether pierce current mode is enabled. In various embodiments, enabling of pierce current mode may be accomplished via a user interface, such as a touch screen, keypad, dial, or other indicating device. If not enabled, the flow proceeds to block 310, where the output current is limited to the cut current. At block 304, if pierce current mode is enabled, the flow proceeds to block 306.

At block 306, a determination is made as to whether a pierce current limit, meaning a maximum value for pierce current, has been received, such as through a user interface. If not, the flow proceeds to block 312, where the cut current value is overridden for a preset duration and at a preset current limit that is greater than the cut current limit. For example, if a cut current is received that is 60 A, and pierce current is enabled without indication of any specific value, a preset limit of 90 A for pierce current may be set as the output current for two seconds as a default period. After the two seconds, the output current (cut current) may be limited to 60 A for the balance of time used for a cutting operation. If a pierce value has been received, the flow proceeds to block 308.

At block 308 a determination is made as to whether a pierce current time or duration has been received, such as through a user interface. If not, the flow proceeds to block 314, where the cut current value is overridden for a preset duration at the received pierce current limit. For example, if a pierce current value received is 80 A, a preset duration for providing 80 A of pierce current may be set as two seconds as a default period. After the two seconds, the output current (cut current) may be limited to 60 A for the balance of time used for a cutting operation. If a pierce current time selection has been received, the flow proceeds to block 316, where the cut current value is overridden for the received duration of pierce current at the value received for pierce current limit.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below are to be construed in view of the full breadth and spirit of the present disclosure as described herein.

What is claimed is:

1. An apparatus, comprising:
a power supply to generate an output current;
a plasma torch to apply the output current across a gap;
a controller to temporarily increase the output current from a first level to a second level, wherein the first level is sufficient to cut a given material, and wherein the second level is greater than the first level and is sufficient to pierce the given material; and
a user interface, wherein the user interface comprises a PIERCE CURRENT ENABLE selection operative to enable the power supply to generate output current up to values corresponding to the second level, and
wherein the user interface comprises a selection for THICKNESS of the given material, and the controller is operative to set the first level and the second level based on a selected thickness of the given material.

2. The apparatus of claim 1, the controller operative to set the output current to the second level for an initial period, and to set the output current to the first level for a subsequent period immediately following the initial period.

3. The apparatus of claim 2, the first level comprising an output current for a cutting operation over a duration greater than five seconds.

4. The apparatus of claim 2, the second level comprising an output current to be applied during the initial period, wherein the initial period has a duration of two seconds or less.

5. The apparatus of claim 1, wherein the first level of the output current is based upon a duty cycle for operation of the plasma torch.

6. The apparatus of claim 1, wherein the user interface comprises a selection for PIERCE CURRENT DURATION for setting a duration for operation at the second level.

7. The apparatus of claim 1, wherein the user interface comprises a selection for PIERCE CURRENT LIMIT for setting a maximum current at the second level.

8. An apparatus, comprising:
a power supply to generate an output current;
a plasma torch to apply the output current across a gap; and
a controller to temporarily increase the output current from a first level to a second level,
wherein the first level is sufficient to cut a given material, and wherein the second level is greater than the first level and is sufficient to pierce the given material,
wherein the second level is set according to the first level automatically without user intervention.

9. An apparatus to control a plasma cutting operation, comprising:
a power supply to generate an output current;
a plasma torch to apply the output current across a gap; and
a controller arranged to:
set the output current to a zeroth level for arc initiation;
increase the output current from the zeroth level to a temporary second level for a predetermined duration of five seconds or less; and
subsequently decrease the output current to a steady state first level cutting current for a balance of the plasma cutting operation,
wherein the steady state first level cutting current is sufficient to cut a given material, and wherein the temporary second level is greater than the steady state first level cutting current and is sufficient to pierce the given material, and
wherein the temporary second level is set higher than an output current associated with a predetermined duty cycle of the apparatus when the apparatus is set to output the steady state first level cutting current.

10. The apparatus of claim 9, further comprising:
a user interface to receive a selection for enabling a pierce current mode, wherein the controller is operative to increase the output current from the zeroth level to the temporary second level, when the pierce current mode is enabled.

* * * * *